United States Patent
Glucksman et al.

(10) Patent No.: US 9,079,706 B2
(45) Date of Patent: *Jul. 14, 2015

(54) INFUSIBLE MATERIAL CAPSULE FOR BREWING A BEVERAGE

(71) Applicant: SolaBev LLC, Denver, CO (US)

(72) Inventors: Dov Z. Glucksman, Danvers, MA (US); David Normand Belanger, Topsfield, MA (US); Gary P. McGonagle, Lynn, MA (US); Laura J. Nickerson, Fitchburg, MA (US)

(73) Assignee: SolaBev LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/670,113

(22) Filed: Nov. 6, 2012

(65) Prior Publication Data

US 2013/0078340 A1 Mar. 28, 2013

Related U.S. Application Data (63) Continuation of application No. 11/772,388, filed on Jul. 2, 2007, now Pat. No. 8,322,271.

(51) Int. Cl.
*A47J 31/40* (2006.01)
*B65B 29/02* (2006.01)
(Continued)

(52) U.S. Cl.
CPC .......... *B65D 85/8043* (2013.01); *A47J 31/369* (2013.01)

(58) Field of Classification Search
CPC ............. B65D 85/816; B65D 83/0463; B65D 85/8043; A47J 31/3628; A47J 31/369
USPC ............... 99/287, 295, 302 R, 282, 283, 288; 426/80, 431, 433, 435, 77, 78, 79, 112
See application file for complete search history.

(56) References Cited

U.S. PATENT DOCUMENTS 4,136,202 A 1/1979 Favre
4,389,925 A 6/1983 Piana
(Continued)

FOREIGN PATENT DOCUMENTS

EP 1580144 A1 9/2005
EP 2166903 B1 8/2012
(Continued)

OTHER PUBLICATIONS

European Patent Office, Communication, EP Application No. 08781158.4 mailed May 11, 2011.
(Continued)

*Primary Examiner* — Dana Ross
*Assistant Examiner* — Ket D Dang (57) ABSTRACT

A sealed capsule for use in apparatus including a capsule receiving station and a water delivery system for brewing a hot beverage in which a hot liquid under pressure infuses a material. A capsule base has a concave bottom floor with angularly spaced structural ribs that form channels for directing brewed beverage to a sharpened spout. A collar surrounds the dispensing spout. A foil attaches to the collar to overlie the spout. A filter lies on the structural ribs. Infusible material lies on the filter. A water distribution plate overlies the infusible material. A cover closes the base unit and includes a water inlet. As the capsule seats in the capsule receiving station, the foil seal is forced over the sharpened spout to rupture and enable brewed beverage to be dispersed. A probe of the water delivery system also penetrates the cover to direct water into the capsule without contacting the infusible material or the brewed beverage.

16 Claims, 10 Drawing Sheets

(51) Int. Cl.
*B65D 85/804* (2006.01)
*A47J 31/36* (2006.01)

(56) References Cited

U.S. PATENT DOCUMENTS

| | | | |
|---|---|---|---|
| 4,846,052 A | 7/1989 | Favre et al. | |
| 4,921,712 A | 5/1990 | Malmquist | |
| 5,083,503 A | 1/1992 | Van Hattem et al. | |
| 5,197,374 A | 3/1993 | Fond | |
| 5,242,702 A | 9/1993 | Fond | |
| 5,347,916 A * | 9/1994 | Fond et al. | 99/295 |
| 5,445,291 A | 8/1995 | Daniel | |
| 5,482,177 A * | 1/1996 | Keller | 220/278 |
| 5,490,448 A | 2/1996 | Weller et al. | |
| 5,794,519 A | 8/1998 | Fischer | |
| 5,863,577 A * | 1/1999 | Lynch et al. | 426/112 |
| 5,897,899 A | 4/1999 | Fond | |
| 6,095,032 A | 8/2000 | Barnett et al. | |
| 6,499,388 B2 | 12/2002 | Schmed | |
| 6,533,113 B2 * | 3/2003 | Moscovitz | 206/222 |
| 6,536,332 B2 | 3/2003 | Schmed | |
| 6,606,938 B2 * | 8/2003 | Taylor | 99/295 |
| 6,607,762 B2 | 8/2003 | Lazaris et al. | |
| 6,681,960 B2 | 1/2004 | Garman | |
| 6,786,134 B2 | 9/2004 | Green | |
| 6,832,542 B2 | 12/2004 | Hu | |
| 6,880,454 B2 | 4/2005 | Kollep | |
| 6,966,251 B2 | 11/2005 | Yoakim | |
| 7,097,074 B2 | 8/2006 | Halliday et al. | |
| 7,703,381 B2 | 4/2010 | Liverani et al. | |
| 2003/0172813 A1 | 9/2003 | Schifferle | |
| 2004/0197444 A1 * | 10/2004 | Halliday et al. | 426/112 |
| 2005/0103204 A1 | 5/2005 | Halliday et al. | |
| 2005/0150390 A1 * | 7/2005 | Schifferle | 99/295 |
| 2005/0150391 A1 | 7/2005 | Schifferle | |
| 2005/0172822 A1 | 8/2005 | Macchi et al. | |
| 2006/0019000 A1 * | 1/2006 | Zanetti | 426/112 |

FOREIGN PATENT DOCUMENTS

| | | |
|---|---|---|
| JP | 06-315349 A | 11/1994 |
| JP | 05-199071 A | 7/2005 |
| WO | WO2004087529 A1 | 10/2004 |
| WO | WO2005092160 | 10/2005 |
| WO | WO2005092162 | 10/2005 |

OTHER PUBLICATIONS

Written Opinion of the International Searching Authority.
International Search Report.

* cited by examiner

INFUSIBLE MATERIAL CAPSULE FOR BREWING A BEVERAGE

CROSS REFERENCE TO RELATED APPLICATION

This application is a continuation of U.S. application Ser. No. 11/772,388 filed Jul. 2, 2007 for an Infusible Material Capsule for Brewing a Beverage assigned to the same assignee as the present invention. U.S. patent application Ser. No. 11/772,416 filed Jul. 2, 2007 for a Hot Beverage Brewing Apparatus, now U.S. Pat. No. 8,180,204 granted May 15, 2012, assigned to the same assignee as the present invention and incorporated by reference herein.

BACKGROUND OF THE INVENTION

1. Field of the Invention

This invention generally relates to the brewing of beverages. More specifically this invention relates to the construction and manufacture of sealed capsules containing infusible material, such as ground coffee, for brewing beverages.

2. Description of Related Art

For many years preparing a beverage, such as coffee, has involved brewing multiple servings in a pot or other container using loose coffee grounds. In some apparatus, the coffee grounds mix with hot water and are then removed from the brewed beverage as, for example, in the so-called "French press" coffee maker. Other apparatus directs hot liquid at low pressure through an open or closed basket containing the loosely ground coffee over a filter, such as a paper filter cone.

The procedures and apparatus for brewing beverages, particularly coffee, have undergone many transformations in recent years spurred by different market requirements. A convenience requirement led to prepackaged packets of ground coffee as a substitute for manually measuring coffee from bulk packages of loose, ground coffee, as in conventional drip coffee makers. A prepackaged packet comprises a permeable filter paper pouch with a pre-measured portion of loose ground coffee. An impervious package stores the packet to maintain freshness. A packet is removed from its package and placed in a basket or like receptacle. Then hot water at atmospheric pressure flows through the packet and its contents for extracting flavor and aroma from the ground coffee.

Another market requirement has evolved as many users have indicated a preference to brew individual beverage servings. This preference for single-serve coffee brewing apparatus, especially for home use, led to the development of prepackaged disposable coffee capsules, or cartridges, and related brewing apparatus. For example, U.S. Pat. No. 4,921,712 to Malmquist discloses a disposable cartridge for use in an automatic drip-type beverage brewing machine. The cartridge comprises a first cup which has an open first end and a substantially closed second end penetrated by at least one port. A filter member contains ground coffee and nests within the first cup. A second cup has an open bottom end and a substantially closed top end and overlies the first cup. The closed end of the second cup has a plurality of holes and forms a shallow receptacle. A user removes a sealing foil from the second cup and places the cartridge on ledges in a brewing apparatus spaced from a water delivery spout. The apparatus delivers hot water at low pressure and at a controlled rate onto the top of the cartridge. There is no requirement for sealing between the apparatus and the cartridge so long as water does not overflow the shallow receptacle.

U.S. Pat. No. 7,097,074 (2006) and U.S. Patent Application No. 2004/01997444 both to Haliday et al. and U.S. Pat. No. 6,681,960 (2004) to Garman disclose another low-pressure beverage preparation system. In this system a brewing chamber receives a cartridge.

Minimizing the brewing time became another market requirement. It was determined early on that the extraction time or "brewing cycle" of such brewing apparatus could be shortened significantly if coffee beans were ground more finely than those used in such drip-type brewing apparatus. Finer grinding exposes a larger surface area to the water. However, the coffee grounds have a higher packing fraction and volumetric density. This increases hydraulic resistance to the flow of water through the cartridge and the grounds therein. Therefore, the water has to be delivered in a closed brewing chamber under an elevated pressure to be able to flow through the coffee in a short period of time.

This led to a development of sealed brewing chambers formed by members that are integral to the brewing apparatus. For example, U.S. Pat. No. 4,389,925 (1983) to Paina describes a beverage extracting and dispensing machine for use with flattened round cartridges. A cartridge contains a brewable product, such as ground coffee, and has permeable upper and lower walls traversing a substantially cylindrical side wall. In this reference a pressure plate coacts with the cartridge to provide sealing.

However, brewing under pressure creates a problem because seals about a brewing chamber are subject to leaking. One approach has been to design brewing chambers with intricate seals. However, as the seals become more important to the integrity of the process, the placement of capsules becomes more critical to prevent water from bypassing the capsule and to avoid interference between portions of the capsule and the brewing chamber that could cause the seal to leak.

Ease of cleaning has become yet another market requirement. Cleaning such brewing apparatus can be complicated and can introduce complexities in the design and manufacture of such apparatus. A sealed brewing chamber is a part of the brewing apparatus and its surfaces contact the brewed beverage. Thus, after use, it is necessary to clean the interior surfaces of the brewing chamber. Preferably such surfaces should be on components of the apparatus that are easily removed for cleaning.

Use of such brewing apparatus in a non-residential or non-home environment, such as in a hotel room or other commercial environment, imposes still other market requirements. Criteria for this commercial market are quite different. In a hotel environment, for example, in-room coffee apparatus must be inexpensive, be operated reliably with minimal operating costs and be easy to use. Moreover, and most importantly, such brewers must minimize the efforts of room attendants to clean and maintain the brewing apparatus, to dispose of used coffee grounds and to replenish coffee supplies in the room. In many hotels, in-room coffee apparatus includes a water heater, cups and prepackaged, pre-measured sealed packets of instant coffee. Other hotels have begun to use conventional coffee brewing machines that use capsules or cartridges to brew the coffee.

The advent of a desire to use a single apparatus to brew different serving sizes imposed another market requirement. When single-serve coffee brewing apparatus was introduced, there was a de facto standard serving size of about 175 ml (6 oz.). Over time, however, different single-serving sizes have become popular, requiring pre-measured packages of coffee in different sizes. One approach is to supply each pre-measured quantity in a cartridge of a unique size and capacity. A requirement for capsules of different sizes requires the capsule manufacturer to inventory parts for each size and adjust various parameters of the manufacturing process to accommodate such sizes. Moreover, differently sized capsules can complicate the construction of brewing apparatus to allow the apparatus to accommodate capsules of different sizes.

All of these market requirements have led to proposals for a wide variety of capsule structures and related apparatus. For example, U.S. Pat. Nos. 5,197,374, 5,242,702 and 5,897,899 (199) to Fond disclose devices for extracting coffee contained in a cartridge and a number of variations on sealed cartridges. The cartridge has a cup and cover to form a sealed container for an infusible material. When installed in a brewing apparatus, a water injector pierces either the cover or the cap to apply water under pressure to be discharged through a flow grill or like portion of the capsule.

In U.S. Pat. No. 4,846,052 to Favre et al., a device extracts material, such as coffee, from an infusible material contained in a sealed cartridge by puncturing one end of a cartridge with a sharpened water delivery tube and by perforating the other end of the cartridge to dispose the brewed beverage into a dispensing passage.

U.S. Pat. No. 5,794,519 (1998) to Fischer discloses a brewing head including lower and upper parts hingably connected together. A plurality of hollow needles project from the upper part into a brewing cavity for delivering water to the interior of a coffee brewing capsule. The lower part has projections intended to puncture the lower side of the coffee capsule. An ejector device within the upper part ejects a used coffee capsule.

U.S. Pat. No. 6,499,388 (2002) and U.S. Pat. No. 6,536,332 (2003) to Schmed disclose perforator members located in a brew chamber perforating one end of a coffee cartridge for extracting brew from the cartridge. The brew chamber forms a sealed receptacle during brewing.

U.S. Pat. No. 6,880,454 (2005) to Kollep discloses perforator members located in a brew chamber. The perforator members pierce a capsule to deliver water for brewing coffee. U.S. Pat. No. 6,966,251 (2005) to Yoakim discloses an alternate embodiment in which perforator members located in the brew chamber perforate a coffee capsule.

U.S. Patent Application No. 2005/0172822 to Macchi et al. discloses a cartridge for coffee. The cartridge comprises a container for a soluble product, a lid placed on top of the container and a filter positioned inside the container. A bottom wall of the container comprises a thin, weakened central portion and a breakable portion. The brewing apparatus receives the cartridge in a sealed chamber. After brewing, the pressure breaks the bottom to allow the beverage to be dispersed.

U.S. Pat. No. 6,607,762 (2003) to Lazaris et al. discloses a filter cartridge where a permeable beverage filter element divides the interior of the container into first and second chambers. Ribs support the permeable filter within the container. The first chamber contains the beverage medium; the second collects the brewed beverage for dispensing. Infusion and exit probes penetrate a lid to direct water into and brewed beverage from the first and second chambers, respectively.

U.S. Pat. No. 6,832,542 to Hu et al. discloses a capsule for preparation of beverages by directing hot water under pressure to the capsule. A section of the capsule is adapted to deform inwardly upon action of the internal water pressure. The capsule is in a sealed chamber during brewing.

U.S. Patent Application Nos. 2003/0172813, 2005/0150390 and 2005/0150391 to Schifferle disclose cartridges containing a single serving of substance extractable by means of water for preparing a beverage. Fluid director members positioned ahead of and behind the substance distribute the water. A gas-tight foil covers the cartridge. Specifically, U.S. Patent Application No. 2005/0150391 discloses a coffee maker for brewing powder coffee contained in a cartridge. The bottom of the cartridge is provided with an aperture. A foil covers the inside of the bottom of the cartridge.

Experience with prior art capsules and brewing apparatus have led to a new set of required market features for apparatus that can be used in both residential and commercial environments. Specifically these markets demand a capsule containing infusible material such as coffee, which is simple to use and inexpensive to manufacture and which preserves the freshness of the infusible material. The capsules must enable infusible material to be brewed under pressure in the capsule. The capsules must be tamper-proof so an individual user can be assured that others have not touched the capsule contents. When such capsules are used in a brewing apparatus, the brewing capsules must be sufficiently rigid for being stored in and dispensed from vending machines or other dispensers for preventing damage during brewing. They must also be readily disposable. Further, the capsule structure must enable the construction of a brewing apparatus that is easy to use and requires minimal maintenance. A review of the prior art described above demonstrates that each different capsule version may meet one or more of the requirements, but not all of them.

What is needed is a capsule that meets all the market requirements, that is easy and inexpensive to manufacture, is easy to use and enables the construction of brewing apparatus that meets all the market requirements for such apparatus and that requires minimal user maintenance.

SUMMARY

Therefore it is an object of this invention to provide a sealed capsule containing an infusible material that can be used in a beverage brewing apparatus that meets all the market requirements.

Another object of this invention is to provide a capsule containing an infusible material that is inexpensive to produce, that preserves the freshness of the infusible material and that is intuitively obvious to use.

Still another object of this invention is to provide a capsule for use in a beverage brewing apparatus that acts as a disposable infusion chamber and that isolates any brewed beverage from the brewing apparatus.

Yet another object of this invention is to provide a capsule that can accommodate different quantities of infusible material.

Yet still another object of this invention is to provide a capsule for infusible material that enables the construction of a beverage brewing apparatus that is easy to use and requires minimal maintenance.

In accordance with one aspect of this invention an infusible material capsule is provided for use in apparatus for dispensing a brewed beverage into a beverage receptacle wherein the apparatus delivers liquid to the capsule and includes a capsule receiving station for supporting said capsule. The capsule includes a capsule base that contains the infusible material. A dispensing structure directs brewed beverage to the beverage receptacle. A standoff extends from the capsule base proximate the dispensing structure for forming a seal support. A seal attaches to the standoff for sealing the dispensing structure. The seal ruptures against the dispensing structure as the capsule seats in the capsule receiving station thereby to enable brewed beverage to pass from the dispenser structure directly to the beverage receptacle.

In accordance with another aspect of this invention, an infusible material capsule is provided for use in apparatus for dispensing a brewed beverage into a beverage receptacle wherein the apparatus delivers liquid to the capsule. The capsule includes capsule base, cover and liquid distribution components. The capsule base component defines an open-ended cavity with a permeable support structure that contains infusible material and from which brewed beverage can be dispensed. The cover attaches to the capsule base and has a pierceable inlet for directing liquid into the cavity from the apparatus. The cover also seals the cavity. The liquid distribution component is intermediate the cover and the infusible material at a predetermined position in the cavity for distributing the liquid across the infusible material. A positioner on the liquid distribution component maintains its position in the cavity whereby the liquid distribution component can be positioned to compress a range of infusible material quantities in the cavity.

In accordance with still another aspect of this invention, an infusible material capsule is provided for use in apparatus for dispensing a brewed beverage into a beverage receptacle wherein the apparatus includes a water delivery probe that delivers hot water under pressure to the capsule and a capsule receiving station. The capsule includes a capsule base having a side wall, an open end and a dispensing structure and having a floor and ribs that channel brewed beverage to the dispensing structure. The dispensing structure includes a sharpened spout extending from the floor, a collar concentric with the spout, and a seal attached to the collar to overlie the spout to provide a first seal for maintaining the freshness of the infusible material, the seal being ruptured over the sharpened spout as the capsule seats in the capsule receiving station.

The capsule additionally includes a filter supported by the ribs, infusible material on the filter, a water distribution plate and a cover. The water distribution plate has a plurality of apertures therethrough and engages the side wall thereby to compact the infusible material against the filter. The cover attaches to the capsule base at the open end thereby to provide a second seal for maintaining the freshness of the infusible material. A portion of the cover is adapted for being penetrated by the water delivery probe to deliver hot water under pressure intermediate the cover and the water distribution plate,

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

In the foregoing Description of Related Art, "capsule" and "cartridge" tend to be used interchangeably. The following description limits the term to "capsule" for purposes of clarity and consistency.

Capsule 20

Figure 4:
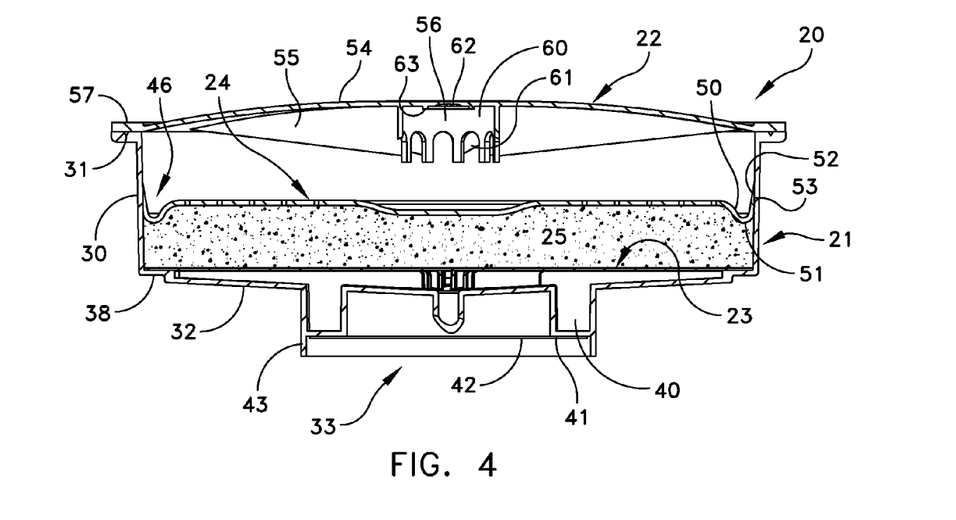
FIG. 4 is a cross-sectional view taken along lines 4-4 in FIG. 1 of an assembled capsule containing a small amount of infusible material.
Figure 5:
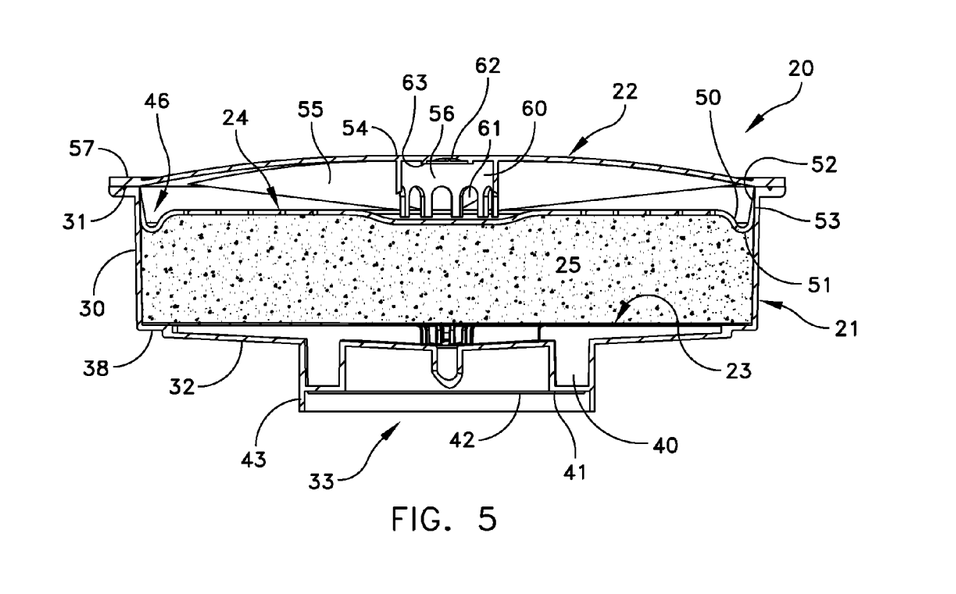
FIG. 5 is a cross-sectional view taken along lines 4-4 in FIG. 1 of an assembled capsule containing a maximum amount of infusible material.

As shown in FIGS. 1 through 11, and particularly FIGS. 1 through 5, an infusible material capsule 20 constructed in accordance with this invention is an integral structure comprising several components. Externally these include a capsule base 21 for containing the infusible material and a capsule cover 22. Internally, the capsule 20 includes a layer of filter paper or filter 23 and a liquid or water distribution plate 24. Infusible material, such as the ground coffee 25 shown in FIGS. 4 and 5, is contained in a cavity intermediate the water distribution plate 24 and the filter 23 and bounded by a side wall 30 of the capsule base 21.

Figure 6:
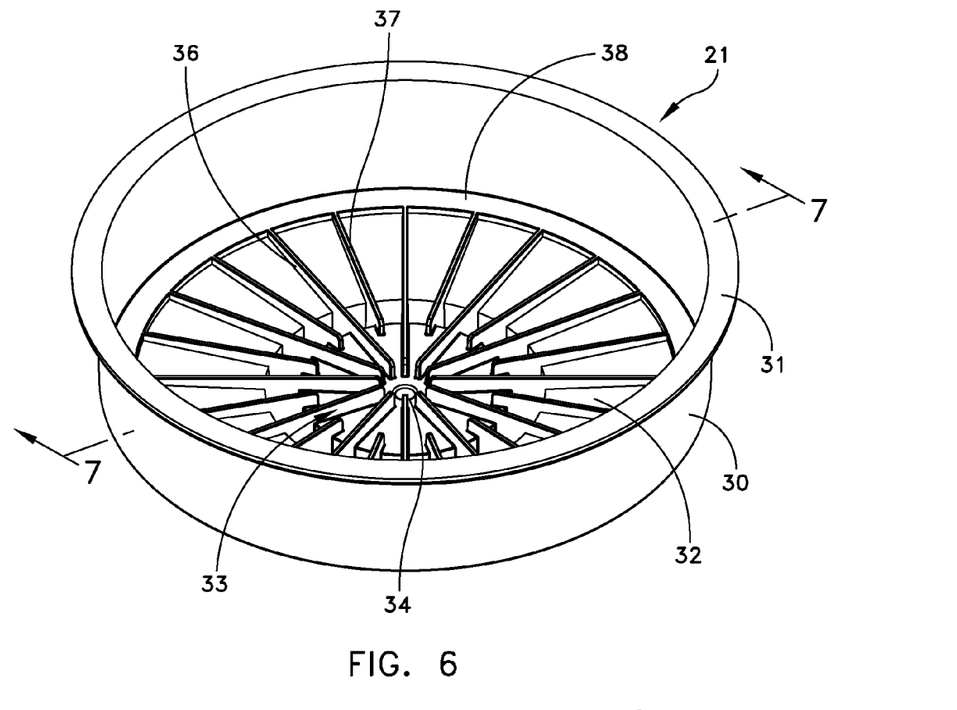
FIG. 6 is a perspective view of a capsule base component for the capsule of FIG. 1.
Figure 7:
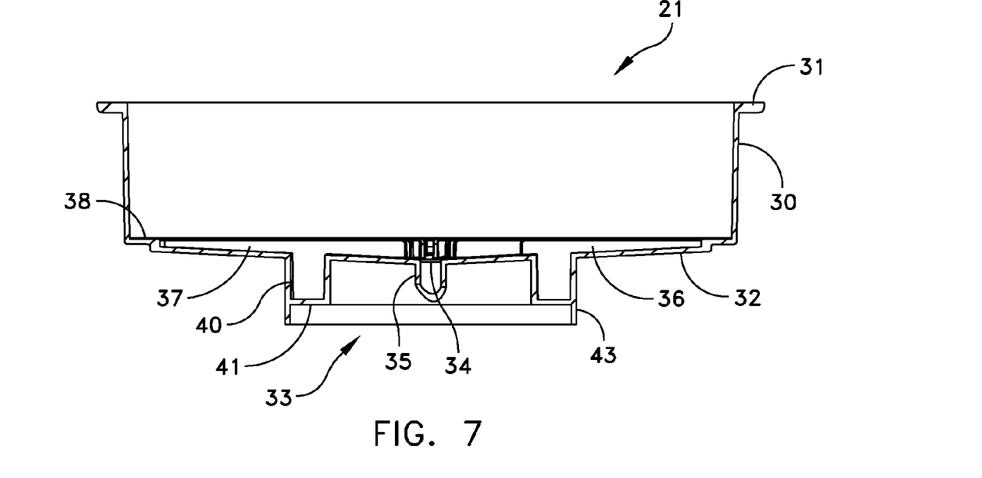
FIG. 7 is a cross-sectional view taken along lines 7-7 in FIG. 6.
Figure 8:
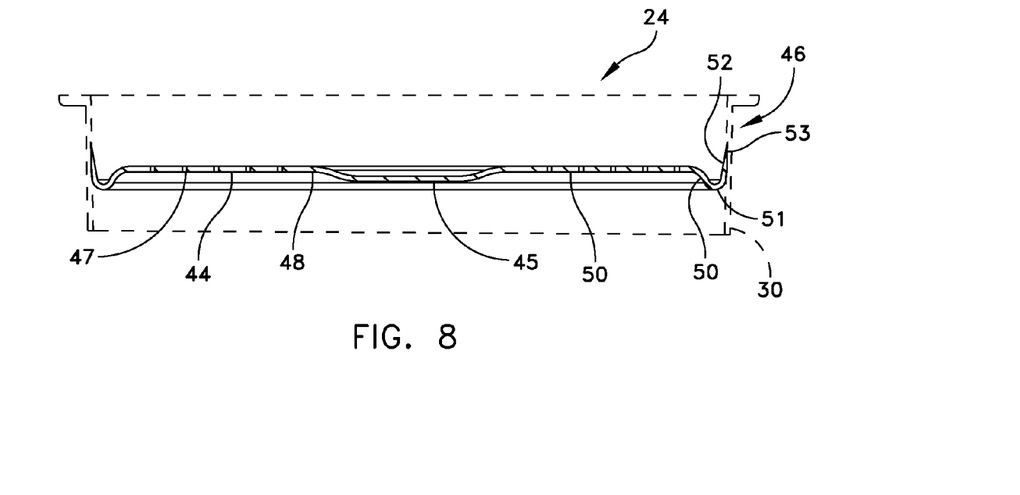
FIG. 8 is a cross-sectional view of a water distribution plate used in the capsule taken along lines 4-4 of FIG. 1.

More specifically and referring to FIGS. 3 through 7, the capsule base 21 includes a side wall 30 and has a cup shape with a closed bottom and an open top. A radially outwardly extending flange 31 on the side wall 30 at the periphery of the open top provides a planar annular support surface for the cover 22. As shown in FIGS. 6 and 7, a floor 32 closes the bottom of the capsule base 21 and is slightly concave in shape. The floor 32 includes a central dispensing structure 33 that directs the brewed beverage through a central aperture 34 and a dispensing spout 35 to a cup or other beverage receptacle. The dispensing spout 35 extends externally, downwardly in FIGS. 3 through 7, from the bottom floor 32 to a free end that is sharpened.

The floor 32 includes integral, radially extending, angularly spaced interior ribs 36 and 37 that taper toward the periphery. The ribs 36 are longer than the ribs 37. These ribs perform multiple functions. They support the filter 23. In combination with the concavity of the floor 32, the ribs 36 and 37 form converging, sloping channels from the side wall 30 down to the aperture 34 thereby to channel brewed beverage through the aperture 34 and the dispensing spout 35. The ribs 36 and 37 also maximize the rigidity of the floor 32 to maintain its structural integrity. In addition, the capsule 20 is formed with a circular ledge 38 at the intersection of the side wall 30 and the floor 32 that further improves capsule rigidity. During manufacture, the filter 23 is affixed to the ledge 38 in a manner known in the art to maintain the position of the filter 23 in the capsule base 21.

Referring specifically to FIGS. 2 through 5 and 7, a rim or collar 40 extends downwardly from the exterior of the floor 32 thereby to form a standoff that is concentric with the spout 35 and proximate thereto. That is, the collar 40 extends for a distance that is at least the distance the spout 35 extends from the floor 32. The collar 40 thereby protects the dispensing spout 35 during handling and storage.

A free end 41 of the collar 40 forms an annular planar support surface that supports a thin gas impermeable sealing foil 42. The foil 42 seals the spout 35 to maintain the freshness of the infusible material 25. The foil 42 also prevents an individual from contacting the sharpened end of the spout 35. An adherent material, or other means, fixes the foil 42 to the free end 41. In this embodiment, an outer peripheral cylindrical extension of the collar 40 forms a protective peripheral barrier or fence 43. The fence 43 prevents any accidental puncture of the foil 42 by being pushed against the free end of the spout 35 prior to its intentional puncture during the brewing process as will be discussed later.

Now referring to FIGS. 3 through 5 and 8, the water distribution plate 24 is a thin plate 44 with a dimpled center portion 45 and a peripheral positioning structure 46. A plurality of spaced apertures 47 extend through the plate in an annular area 48 between the center portion 45 and the positioning structure 46. Each aperture 47 allows the passage of brewing liquid, such as water, but blocks the passage of coffee grounds. The collective or total area for the apertures 47 allows the passage of the volume of liquid being supplied under pressure above the water distribution plate 24 with only a minimum pressure drop. The plurality of apertures 47 can be in a random or ordered array.

The positioning structure 46 in FIGS. 4 and 5 enables the capsule 20 to be manufactured with different quantities of infusible material. Specifically, the positioning structure 46 has a generally J-shape with a downwardly extending leg 50, a reverse bend 51 and a tail 52 with a preferably feathered outer surface 53 that slides over the interior surface of the side wall 30 as the water distribution plate 24 is inserted into the capsule 21.

As described in more detail later, the manufacturing process includes the step of dispensing a quantity of infusible material, such as coffee grounds, into the capsule 20. Referring to FIGS. 4 and 5, the capsule base 21 with an installed filter 23 receives the infusible material. Then the water distribution plate 24 is inserted and displaced toward the bottom wall 32 until a predetermined force has been achieved. This is the force required to compact the infusible material to a specified density.

When that force is released, the positioning structure 46 blocks any reverse displacement. Specifically, the resulting force on the water distribution plate 24 produces a radially outwardly acting force on the tail 52 that forces the feathered outer surface 53 against the interior surface of the side wall 30.

As will be appreciated, when the capsule base 21 is manufactured by injection molding, the side wall 30 will not be cylindrical, but will have a slight inward taper, or "draft" from the open end to the bottom wall 32. This "draft" enables the injection molding dies to separate after a part is formed and the part to be ejected from the mold. As known, these draft angles are only a few degrees. When the draft angle is approximately 2° or less, the resulting frictional force between the feathered outer surface 53 and the side wall 30 is greater than the force trying to displace the water distribution plate 24, so the water distribution plate 24 remains fixed in position.

Thus, this positioning structure 46 is not dependent upon being locked at a mechanically predetermined position within the capsule base 21. Consequently, the positioning structure 46 enables a capsule base 21 to have sufficient depth to accommodate a range of quantities of infusible materials. In one embodiment, the capsule base 21 can accommodate up to 18 grams (0.6 ounces) of coffee. FIGS. 4 and 5 depict different configurations of a single version of a capsule with approximately 9 grams and 18 grams of ground coffee respectively. Thus, the single capsule 20 is flexible because it can provide appropriate quantities of infusible material for cups of different sizes or for different strengths of the infusible material, including, but not limited to, coffee tea and cocoa, or for a combination of size and strength thereof.

In this embodiment the feathered outer surface 53 slides along a smooth inner surface of the side wall 30. It will be apparent to those skilled in the art that other mechanisms to limit a water distribution plate to a one-way motion can be substituted for the specifically disclosed positioning structure 46. For example, a plurality of ridges could be located over portions of the inner side wall surface to provide a positive incremental detent action by interacting with a structure equivalent to the tail 52.

Now referring to FIGS. 3 through 5, 9 and 10, the cover 22 has a dome-like thin circular body 54 with a plurality of angularly spaced, radially extending, tapered ribs 55 extending from a central structure 56 to a peripheral flange 57. The ribs 55 provide structural integrity. As previously indicated, the peripheral flange 57 and the flange 31 on the base 21 are joined to form an integral assembly by ultrasonic welding or other techniques.

Figure 9:
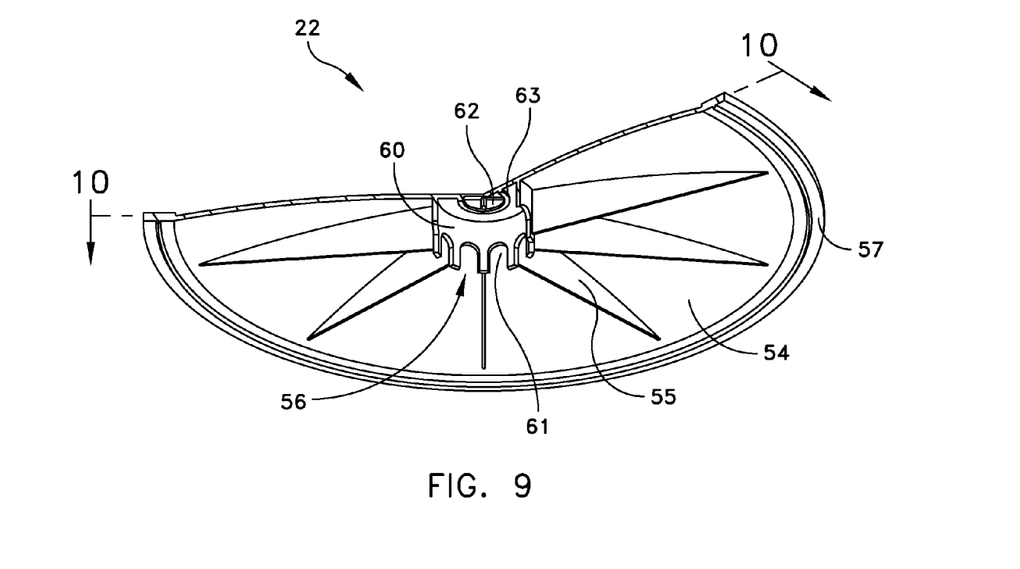
FIG. 9 is a perspective view, partially broken away, of a cover component for the capsule of FIG. 1.
Figure 10:
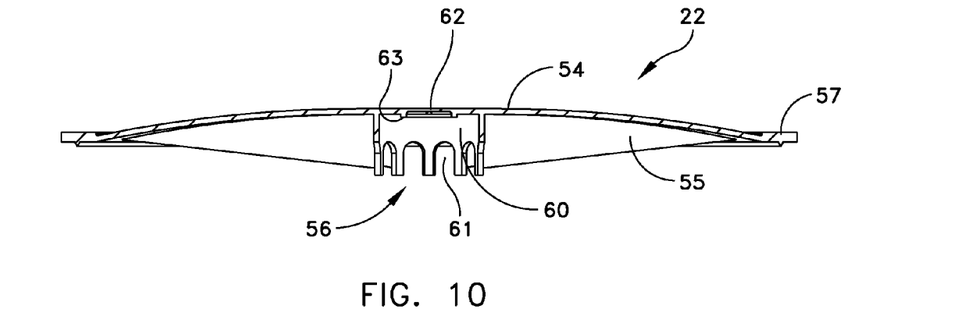
FIG. 10 is a cross-sectional view of the cover taken along the lines 10-10 of FIG. 9.

The central structure 56 enables a water supply probe to pierce the cover 22 to deliver liquid under pressure to the capsule 20. The central structure 56 includes a cylindrical body 60 that depends from the body 54 and terminates with a plurality of radially facing, arched passages 61. A breakout 62 of the cover 22 is aligned with the cylindrical body 60 to facilitate piercing. In this embodiment an integral cylindrical barrier 63 surrounds the breakout 62 to block any propagation of the effects of piercing thereby to preclude any impact on the integrity of the cover 22.

Figure 11:
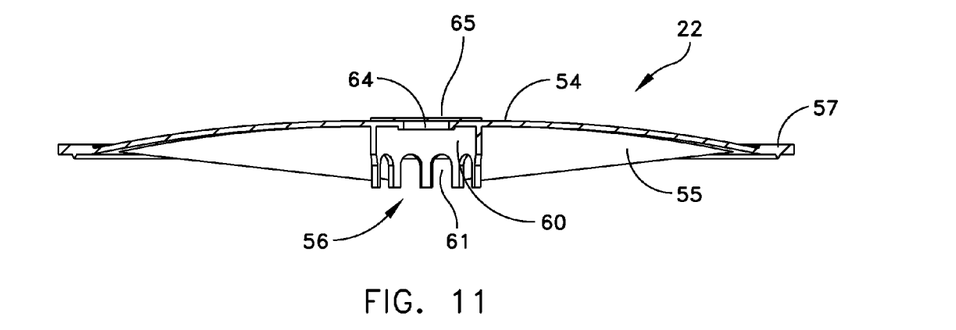
FIG. 11 is a cross-sectional view of an alternate embodiment for a cover.

FIG. 11 depicts an alternative embodiment of the cover 22 wherein like reference numbers identify like elements. In this embodiment, like the embodiment of FIGS. 9 and 10, the central structure 56 includes a cylindrical body 60 that depends from the body 54 and terminates with a plurality of radially facing, arched passages 61. In this embodiment, however, the breakout 62 and barrier 63 of FIGS. 9 and 10 is replaced by a preformed aperture 64 and a gas impermeable sealing foil 65. The sealing foil 65 is fixed to a portion of the body 54 surrounding the aperture 64 to provide necessary sealing to maintain the freshness of the contents. The aperture 64 is sized to receive the probe. With this alternative there is no requirement for breaking any of the material of the body 54 as shown in FIGS. 9 and 10. Rather the probe merely penetrates the sealing foil 65 to access the interior of the capsule 20. This modification permits the foil to be printed with information pertinent to the use of the capsule or to provide information about the content of the capsule.

Capsule Manufacture

Figure 1:
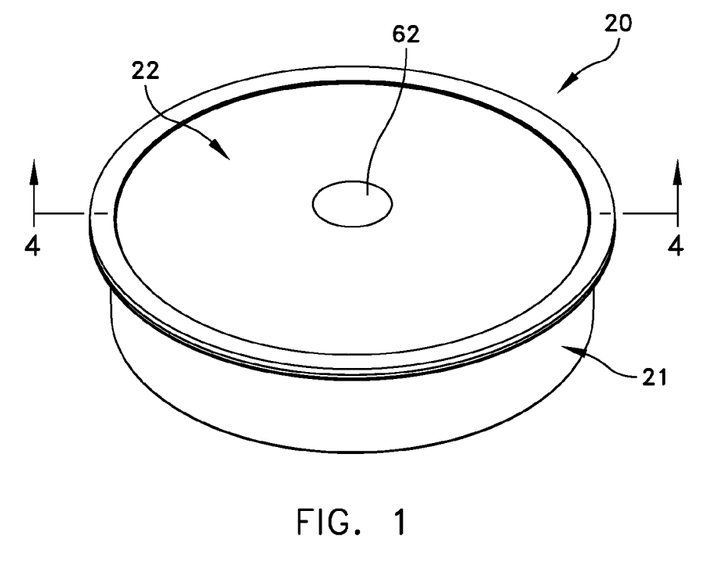
FIG. 1 is a perspective view of a capsule constructed in accordance with this invention.
Figure 2:
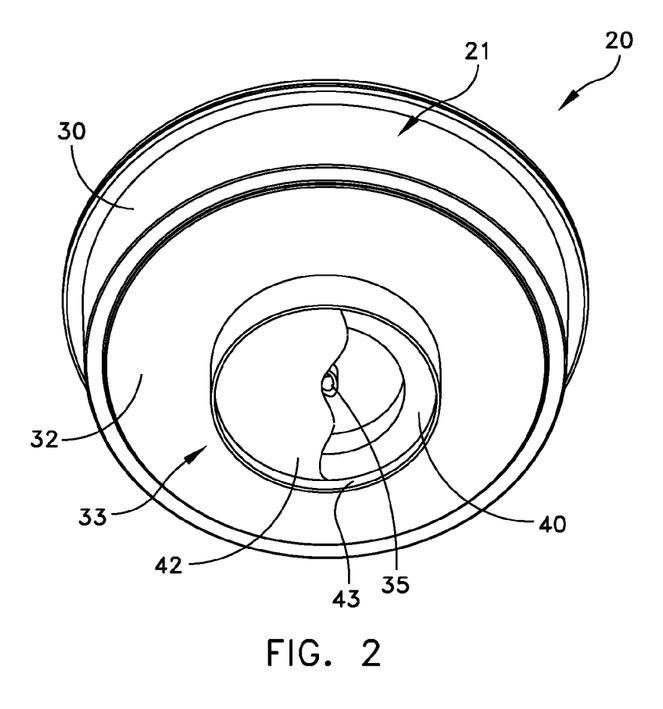
FIG. 2 is another perspective view of the capsule in FIG. 1 with a portion broken away.
Figure 3:
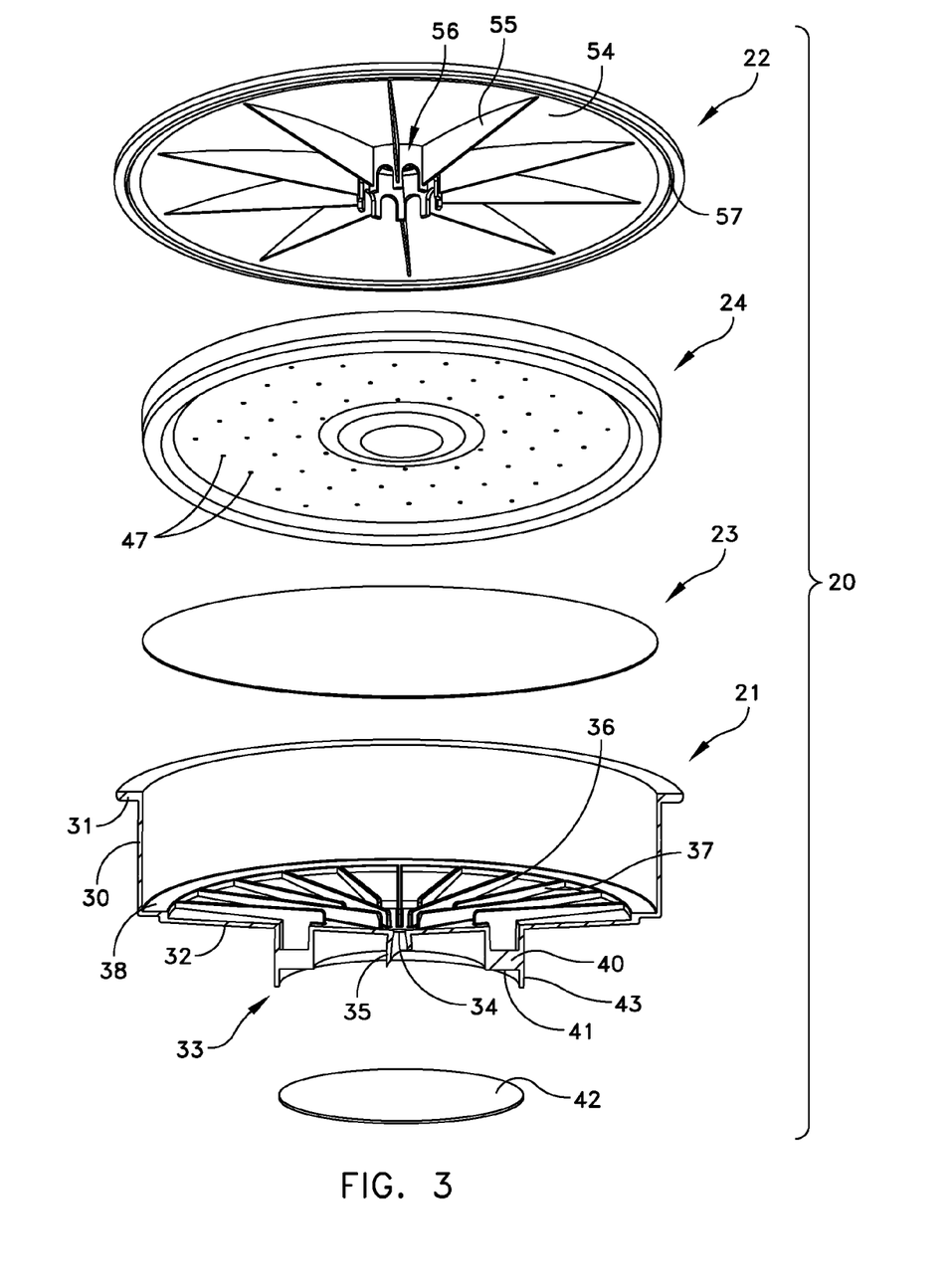
FIG. 3 is a partially sectioned exploded view showing the components of the capsule in FIG. 1 in perspective.

Before describing the operation and use of the capsule 20 in FIG. 1, it will be helpful to review the manufacturing process for the capsule 20. As will become apparent, the foregoing construction greatly simplifies the manufacturing process. First, it is possible to manufacture each of the components shown in FIG. 3, namely the base 21, the cover 22, the filter 23, and water distribution plate 24 and the foil 42 in advance. With the proper selection of the depth of the base 21, only one version, or only a limited number of versions, will be required for this component to cover a wide range of content capacity. All the other components will be identical notwithstanding the quantity of infusible material to be included in the capsule 20. Further, other than the filter 23, and foil 42, all the other components can be manufactured by injection molding or other inexpensive manufacturing processes. Filters 23 and foil 42 can be punched or otherwise cut from sheets or the like. Consequently, there is only a minimal cost associated with the manufacture of the components.

Figure 12:
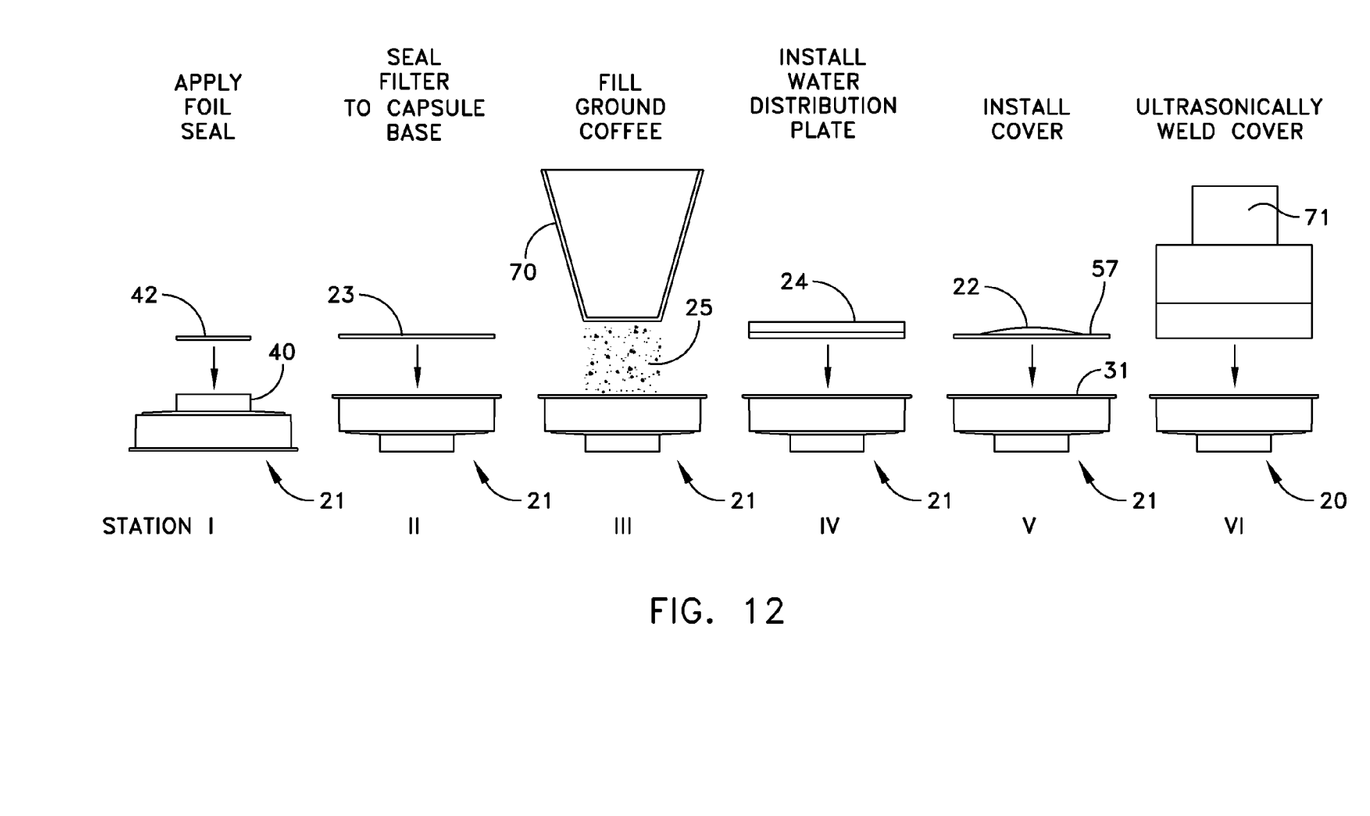
FIG. 12 depicts a process for manufacturing capsules of this invention.

FIG. 12 schematically illustrates a process for manufacturing capsules, such as the capsule 20 in FIGS. 1 through 5. The process begins at Station I by inverting the capsule base 21 as shown for the application of the foil 42 onto the collar 40.

During a transfer from Station I to Station II, the capsule base 21 is inverted to an upright position. Station II loads the filter 23 into the capsule base 21 to lie atop the ribs 36 and 37 and be affixed to the circular ledge 38 as shown in FIG. 6. At Station III a dispenser, shown schematically as a dispensing tube 70, deposits an allocated quantity of infusible material, such as coffee grounds 25 into the capsule base 21 over the filter 23.

At Station IV other manufacturing apparatus advances the water distribution plate 24 into the capsule base 21 to an appropriate position to achieve the desired packing density.

At Station V, other manufacturing apparatus attaches the cover 22 to the top of the base 21 such that the flanges 31 and 57 are aligned for being joined by an ultrasonic welder 71 or other known apparatus to form the completed capsule 20 at Station VI. As will be apparent, an inert gas, such as argon or nitrogen may be introduced into the capsule 20 prior to installing the cover 22. The introduction of such a gas displaces any air within the capsule 20 to assist in preserving freshness.

As will now be apparent, the capsule 20 constructed in accordance with this invention and shown in FIGS. 1 through 5 is inexpensive to produce. It is sealed to preserve the freshness of the infusible material. Further, as best illustrated in FIGS. 4 and 5, the capsule 20 can receive a range of quantities of infusible material. The adjustments necessary to change the quantity of infusible material are operating changes that control the dispenser 70 and the force applied to the water distribution plate 24. No tooling changes are involved, as might be to accommodate capsule bases of different depths. The dimpled center 45 of the water distribution plate 24 provides some additional capacity by allowing the balance of the water distribution plate 24 to have a final position above the central structure 56 such that the integrity of the dimpled center 45 is not compromised during the piercing operation.

Brewing Apparatus

Figure 13:
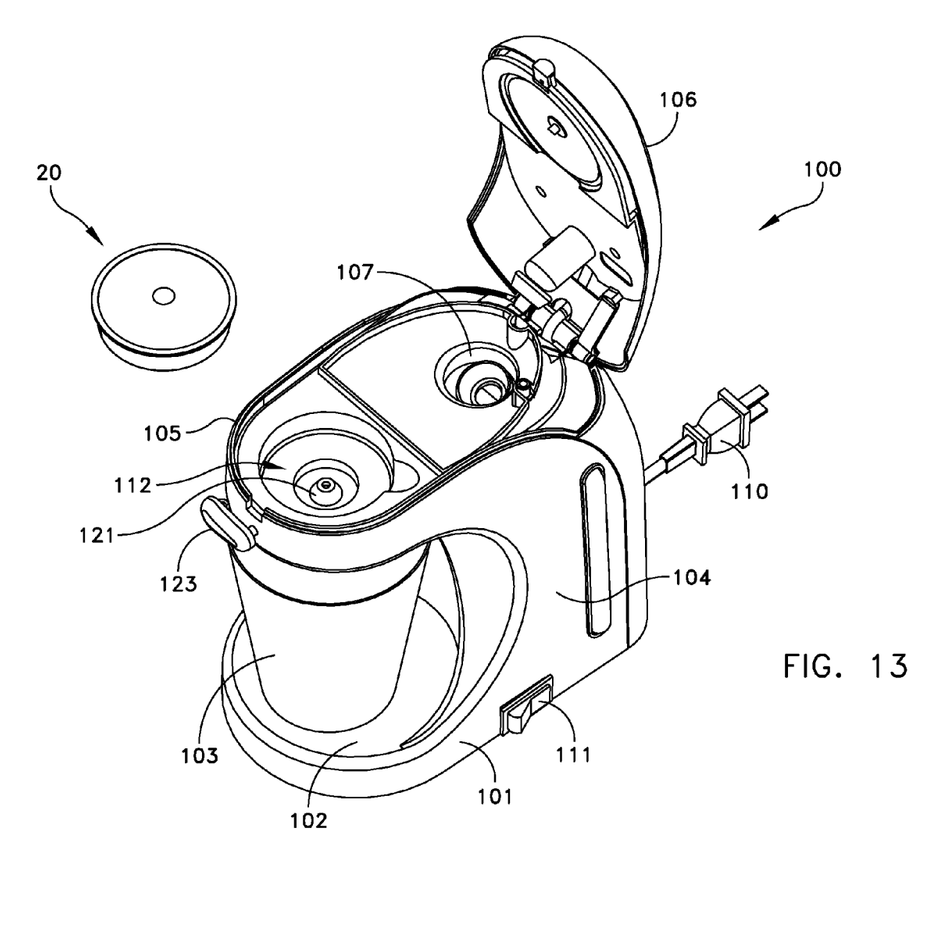
FIG. 13 is a perspective view of beverage brewing apparatus adapted to utilize a capsule constructed in accordance with this invention with its lid open.
Figure 14:
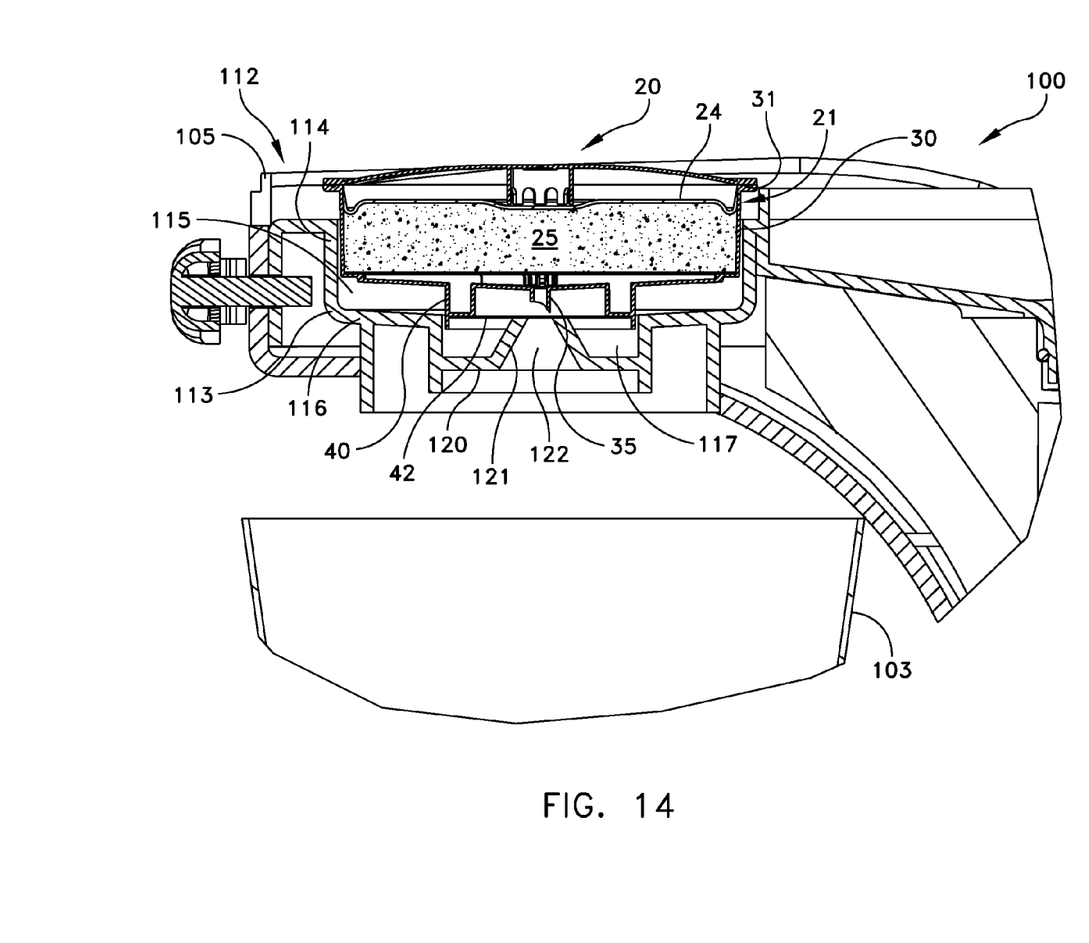
FIG. 14 is a cross-sectional view through a portion of the apparatus shown in FIG. 13 with an open lid.
Figure 15:
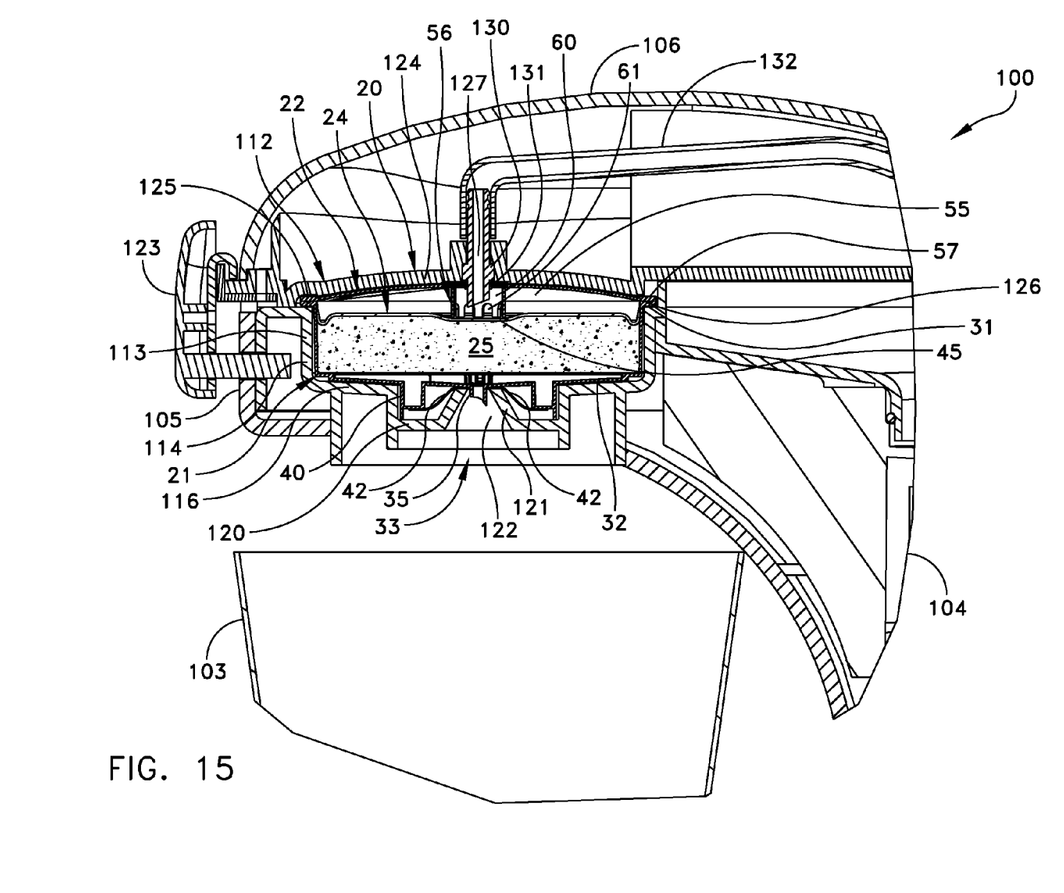
FIG. 15 is a partial cross-sectional view like that in FIG. 14 with a closed lid.

The manner in which a capsule constructed in accordance with this invention, like the capsule 20 in FIG. 1, enables the construction of brewing apparatus that further meet the various objectives of this invention can be better understood by referring to FIGS. 13 through 15 that disclose one embodiment of a brewing apparatus 100 that takes advantage of the characteristics of the capsule 20. As particularly shown in FIG. 13, the brewing apparatus 100 has a base structure 101 with a platform 102 for receiving a mug, cup or other type of beverage receptacle 103.

A vertical structure 104 rises from the base structure 101 and supports an upper structure 105 that cantilevers over the platform 102 The vertical structure 104 also carries a hinged lid 106 and houses the electrically operated equipment for producing hot water under pressure. In this particular apparatus the user can pour a required quantity of water into a water filling station 107 that is exposed when the lid 106 is open. The apparatus 100 also includes a power cord 110 and a switch 111 to initiate and terminate operations. Finally, the upper structure 105 also has a capsule receiver station 112.

When the lid 106 is open, a user inserts the capsule 20 into the capsule receiver station 112. Referring specifically to FIG. 14, the capsule receiver station 112 includes a cup-shaped receiver component 113 with a cylindrical side wall 114 that forms a well 115 that closely fits the capsule side wall 30. A floor 116 has a central opening 117 formed by an annular depending channel 120 with an inner frustoconical wall 121 that forms an inverted funnel-like opening 122. At the top of the frustoconical wall 121, which is also shown in FIG. 13, the opening 122 has a diameter that is larger than the diameter of the spout 35. The outer diameter at the base of the wall 121 is less than the inner diameter of the collar 40. As shown in FIG. 14, when a user places a capsule 20 in the capsule receiver station 112, the upper surface of the frusto conical wall 121 initially supports the capsule 20 at the foil 42. So the capsule 20 remains sealed.

Next, and referring to FIGS. 14 and 15, the user closes the lid 106 and uses a latch 123 to fix the lid 106 in a latched position. As shown in FIG. 15, the lid 106 includes cover member 124. The cover member 124 has a smooth inner surface and an annular peripheral clamping surface 125. The clamping surface 125 aligns with a free edge 126 of the sidewall 114 for the capsule receiver member 113. The lid 106 also supports a water delivery probe 127 with a central body portion 130 and a seal, a flat annular seal 131 in this embodiment. The water delivery tube attaches to a hot water delivery tube 132 from a hot water delivery system that delivers hot water under pressure to the probe 127.

Still referring to FIG. 15, as the user closes and latches lid 106, several actions occur essentially simultaneously. For example, the water delivery probe 127 penetrates the cover 22 through the breakout 62 shown in FIG. 9) and the flat seal 131 seals the cover 22 to the cover member 124.

As the cover member 124 exerts a downward force on the cover 22, the capsule displaces downward into the cup-shaped receiver component 113. This causes the frustoconical wall 121 to rupture the foil 42 over the sharpened spout 35 and to expose the open spout 35 in the opening 122. This downward motion continues until the capsule base floor 32 seats on the floor 116. The collar 40 then lies positioned in the annular channel member 120.

As the lid 106 latches, the capsule 20 is firmly held inside the cavity defined by the receiver member 113 and the clamping member 124, with the center of the cover 22 proximate the flat annular seal 131.

FIG. 15 depicts the water distribution plate 24 at its maximum height. Probe penetration is limited and terminates above the dimpled center 45. Thus with the lid 106 closed and latched, a closed path for liquid exists from the delivery tube 132, through the probe 127 and the capsule 20 to the spout 35. Both the hot water and brewed beverage are confined to the interior of the capsule 20. The brewed beverage does not contact any portion of the apparatus 100.

In use, once the lid 106 is latched in place, the user closes the switch 111 to initiate operation whereupon the electrical equipment apparatus in the vertical structure 104 produces hot water under pressure at the requisite temperature. A delivery tube 132 and the probe 127 direct the hot water into a chamber defined between the cover 22 and the water distribution plate 24. In this upper plate position, the water flows through the arched passages 61 particularly shown in FIGS. 9 and 10 to spread over the top of the water distribution plate. When the cavity between the cover 22 and water distribution plate 24 fills, the pressure stabilizes and the water is forced through the distribution plate apertures and coffee grounds to be dispensed through the floor 32 and spout 35 into the receptacle 103. The internal water pressure also provides the sealing force between the cover 22 and the flat annular seal 131.

As will now be apparent, the probe 127 also does not contact either the brewed beverage or the coffee grounds. Specifically, the water distribution plate 24 prevents coffee grounds from migrating into the cavity between the cover 22 and the water distribution plate 24. As essentially all the pressure drop occurs across the coffee grounds, brewed beverage does not migrate above the water distribution plate 24.

A capsule incorporating the features of this invention enables the construction of a brewing apparatus, such as the brewing apparatus 100, which achieves many objectives of this invention. Using apparatus for brewing coffee as an example, a user opens the lid, selects a capsule and deposits it in the capsule receiver station, pours water into the apparatus at the water inlet station, closes the lid and turns on a switch. When the coffee has been brewed, the user only has to remove the filled beverage receptacle from the apparatus. There is no requirement for further user intervention. As a result, the apparatus is easy to use. As the beverage is brewed within the capsule, no brewed beverage or infusible material contacts any part of the brewing apparatus. Consequently the brewing apparatus requires minimal cleaning because there is no need to clean any portion of the capsule receiver station.

A capsule in accordance with this invention also allows a hotel or other commercial establishment to provide its customers or employees with a variety of brewing options from a single brewing apparatus. For example, a hotel could provide apparatus in each room with a variety of capsules of the same exterior dimensions with different types of infusible material, such as Columbian coffee, decaffeinated coffee, tea, cocoa etc. For a given type of infusible material the hotel could also provide a variety of capsules of the same exterior dimensions with different quantities of infusible material for brewing different amounts or strengths of the beverage. Consequently, the hotel could provide the user with a variety of beverage choices. Such capsules constructed in accordance with this disclosure, or variations thereof, could also enable the implementation of brewing apparatus with still other advantages.

This invention has been disclosed in terms of certain embodiments and variations on those embodiments. It will be apparent that the foregoing modifications and many other modifications can be made to the disclosed apparatus without departing from the invention. Therefore, it is the intent of the appended claims to cover all such variations and modifications as come within the true spirit and scope of this invention.

What is claimed as new and desired to be secured by Letters Patent of the United States is:

1. A material capsule (20) for use in apparatus (100) for dispensing a beverage into a beverage receptacle (103) wherein the apparatus includes structure (127, 132) for delivering liquid to said capsule and a capsule receiving station (112) that supports said capsule, said capsule including a capsule base (21) containing the material therein, dispensing structure (33) on said capsule base for directing beverage to the receptacle, said capsule base having a floor with a centrally positioned aperture (34) forming part of said dispensing structure and a tubular spout (35) extending from said floor forming a passage from the floor aperture, said spout terminating in a sharp free end, and standoff structure including a collar (40) extending from said capsule base proximate said dispensing structure and forming a free end (41) wherein said material capsule further comprises sealing structure including a sealing foil (42) positioned below the sharp free end of said spout and attached to the free end of said standoff structure for sealing said dispensing structure, said sealing foil rupturing against the sharp free end of the spout of said dispensing structure as said capsule seats in said capsule receiving station thereby to enable beverage to pass from said capsule through said aperture and tubular spout of said dispensing structure to the beverage receptacle.

2. The material capsule as recited in claim 1 wherein said floor is concave forming a downwardly sloped surface toward the centrally positioned aperture in said floor.

3. The material capsule as recited in claim 2 further including structure for channeling beverage to said dispensing structure comprising a plurality of angularly spaced, radially extending ribs (36, 37) and said capsule additionally includes structure (23) supported on said ribs for filtering the beverage.

4. The material capsule as recited in claim 1 wherein said collar (40) is spaced from and concentric with said spout.

5. The material capsule as recited in claim 1 wherein said collar terminates in a planar surface and said sealing foil of said sealing structure is attached to said planar surface.

6. The material capsule as recited in claim 1 wherein said capsule base (21) defines an open-ended cavity including a permeable support structure for containing material from which beverage is dispensed, and said material capsule additionally includes:
  a cover (22) attached to said capsule base with a pierceable inlet for directing liquid from the liquid delivery structure into said cavity, said cover sealing said cavity.

7. The material capsule as recited in claim 6 further including liquid distribution structure (24) intermediate said cover and the material at a predetermined position in said capsule base cavity for distributing the liquid across the material, said liquid distribution structure including positioning structure (46) for maintaining the predetermined position of said liquid distribution structure in said cavity whereby said liquid distribution structure is positioned to compress a range of material quantities in said cavity.

8. The material capsule as recited in claim 7 wherein said capsule base includes a peripheral wall (30) about said cavity and said positioning structure includes a flexible member at the periphery of said liquid distribution structure for engaging said wall thereby to allow movement of said liquid positioning structure in said cavity only toward the material.

9. The material capsule as recited in claim 8 wherein said peripheral wall is characterized by a conical shape at a draft angle, wherein said liquid distribution structure includes a planar annular portion (54) and wherein said flexible member comprises a J-shaped peripheral portion extending from said annular portion for engaging said wall.

10. The material capsule as recited in claim 9 wherein said flexible member terminates with a feathered edge surface that engages said wall.

11. The material capsule as recited in claim 6 wherein said cover includes a central structure (56) and a plurality of angularly spaced ribs (55) extending radially from said central structure.

12. The material capsule as recited in claim 6 wherein said structure for delivering liquid to said capsule includes a water delivery probe and said cover includes a central aperture (64) therethrough sized to accommodate said water delivery probe and a sealing foil (65) attached to said cover proximate said central aperture and overlying said central aperture.

13. The material capsule as recited in claim 7 wherein said liquid distribution structure is characterized by an annular portion (48) including a plurality of apertures (47) therethrough for enabling the passage of the liquid therethrough and for confining the material between said permeable support structure in said capsule base and said liquid distribution structure.

14. The material capsule as recited in claim 1 wherein said capsule base (21) extends about a central axis and has a side wall (30) spaced from and extending along and about said central axis wherein said floor (32) extends outwardly of and about said central axis at a first distance, said free end (41) of said collar of said standoff structure extending about said central axis at a second distance substantially less than the first distance said floor extends outwardly of and about said central axis.

15. The material capsule as recited in claim 1 wherein said sharp free end of the spout is substantially wedge-shaped.

16. The material capsule as recited in claim 1 wherein said material is an infusible one.

\* \* \* \* \*